US012743719B2

(12) United States Patent
Ahuja et al.

(10) Patent No.: US 12,743,719 B2
(45) Date of Patent: Sep. 22, 2026

(54) GENERATIVE CONTENT BASED ON USER SESSION SIGNALS

(71) Applicant: Maplebear Inc., San Francisco, CA (US)

(72) Inventors: Karuna Ahuja, San Francisco, CA (US); Girija Narlikar, Palo Alto, CA (US); Chakshu Ahuja, San Jose, CA (US); Apurvaa Subramaniam, Renton, WA (US)

(73) Assignee: Maplebear Inc., San Francisco, CA (US)

( * ) Notice: Subject to any disclaimer, the term of this patent is extended or adjusted under 35 U.S.C. 154(b) by 109 days.

(21) Appl. No.: 18/627,280

(22) Filed: Apr. 4, 2024

(65) Prior Publication Data

US 2024/0338746 A1 Oct. 10, 2024

Related U.S. Application Data

(60) Provisional application No. 63/494,761, filed on Apr. 6, 2023.

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................. G06Q 30/0631
See application file for complete search history.

(56) References Cited

U.S. PATENT DOCUMENTS

2013/0173568 A1 7/2013 Josifovski et al.
2020/0134511 A1 * 4/2020 Ho .......................... G06N 3/08

OTHER PUBLICATIONS

D. Shravani, P. Y. R, P. V. Atreyas and S. G, "VR Supermarket: a Virtual Reality Online Shopping Platform with a Dynamic Recommendation System," 2021 IEEE International Conference on Artificial Intelligence and Virtual Reality (AIVR), Taichung, Taiwan, 2021, pp. 119-123. (Year: 2021).*
PCT International Search Report and Written Opinion, PCT Application No. PCT/US24/23125, Jul. 16, 2024, 15 pages.

* cited by examiner

*Primary Examiner* — Anand Loharikar
(74) *Attorney, Agent, or Firm* — Fenwick & West LLP

(57) ABSTRACT

An online system employs real-time and pre-generated images for recommendation. The system leverages generative machine-learning models, such as diffusion models, to generate images dynamically. The selection and creation of these images rely upon user data and session data, which are collected during a user's application session. These data are employed to generate a text prompt string, which directs the image generation process. For instances where real-time computation may be a resource constraint, the system utilizes pre-generated images linked to user-context clusters—data set groupings related to user characteristics and session context. This method enables the system to present tailored recommendations to the user, making use of both dynamic generation and pre-existing image resources, thereby optimizing the balance between customization, computational resources, and latency.

20 Claims, 6 Drawing Sheets

GENERATIVE CONTENT BASED ON USER SESSION SIGNALS

CROSS-REFERENCE TO RELATED APPLICATIONS

This application claims the benefit of U.S. Provisional Application No. 63/494,761, filed Apr. 6, 2023, which is incorporated by reference.

BACKGROUND

An online system may provide recommendations to users of content to interact with. For example, an online system may recommend items that may be of interest to a user for the user to order from the online system. However, recommendations commonly include content that encourages the user to interact with the content. This content, especially images and video, can be incredibly costly for an online system to generate. This means that online systems generally reuse content for recommendations in many different contexts, but there may be instances where that content is not well suited for the context in which the recommendation is being made. For example, if a user is searching for items for a party, a recommendation for a bag of chips would likely perform better with the user if it included an image of multiple people enjoying the bag of chips, rather than two people sitting down to watch a movie. It is traditionally infeasible to generate the amount of content needed to cover the myriad different contexts in which users may be interacting with an online system, and thus online systems commonly use ineffective content to recommend interactions to users.

SUMMARY

In accordance with some embodiments, an online system dynamically generates images for presentation to users through a client device. Specifically, the online system uses session data describing the user's application session with the online system to determine which images to generate and uses an image generation model to generate the images.

To generate images, the online system accesses user data describing a user of the online system and initiates an application session between the user and the online system. The user can use this application session to interact with the online system. The online system collects session data describing the user's application session and uses the accessed user data and the collected session data to generate a prompt string. The prompt string is a text string describing a prompt for an image to be included in a recommendation to a user. The online system may generate the prompt string using a prompt template with fields for user data and session data.

The online system generates an image for a recommendation by inputting the prompt string to an image generation model. An image generation model is a machine-learning model that is trained to generate images based on a string of text prompting the machine-learning model with what kind of image to generate. In some embodiments, the image generation model is a diffusion model. The online system generates a recommendation for the user based on the generated image and transmits the recommendation to the user's client device for display to the user.

In some embodiments, the online system uses pre-generated images for providing recommendations to users. To identify which pre-generated image to use, the online system may compare a user-context pair to user-context clusters. A user-context pair is a pair of sets of data that represent the user and a context of the user's application session. For example, the user-context pair may, for the user set of data, indicate the user's age and, for the context set of data, indicate what kind of content the user is looking for through the application session. The user-context clusters represent clusters of user-context pairs. For example, the user-context clusters may be associated with criteria that indicate which user-context pairs fall into each cluster.

The user-context clusters are each associated with one or more pre-generated images, which may be generated by the process described herein. For a particular user in an application session, the online system compares the user's user data and session data to the criteria of the user-context clusters and identifies which cluster the user corresponds to. The online system uses a mapping of user-context clusters to pre-generated images to identify which image to present to the user in a recommendation.

By dynamically generating images based on user's session data, the online system leverages generative machine-learning models to expand the corpus of images that the online system can present. The online system can thereby provide a more customized experience for a user. Furthermore, by pre-generating images and associating those pre-generated images with different user-context clusters, the online system can avoid the real-time computational resources and latency required with dynamically generating a new image for each user and each session, yet still gain the customizability benefits of using generative machine-learning models.

DETAILED DESCRIPTION

Figure 1A:
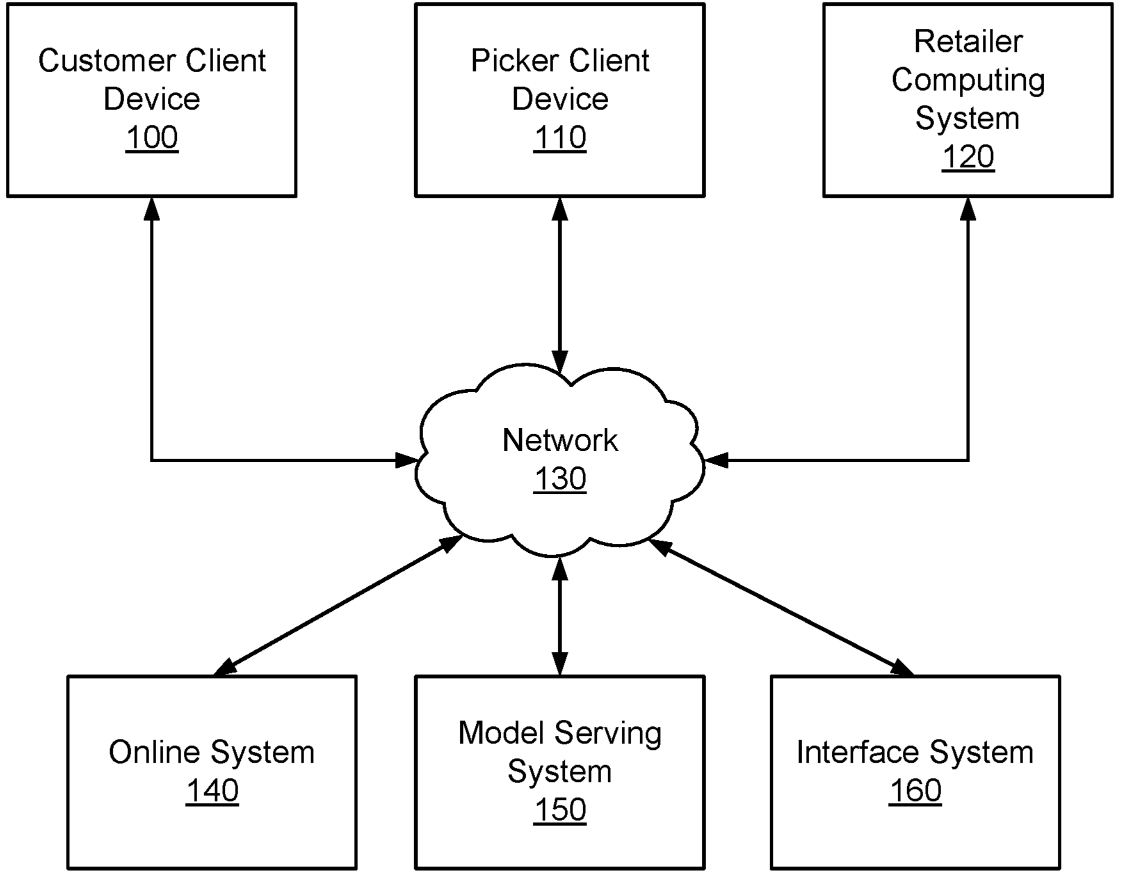
FIG. 1A illustrates an example system environment for an online system, in accordance with some embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140.

Additionally, while one customer client device 100, picker client device 110, and retailer computing system 120 are illustrated in FIG. 1A, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system, such as an online concierge system, by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform inference tasks using machine-learned models. The inference tasks include, but are not limited to, natural language processing (NLP) tasks, audio processing tasks, image processing tasks, video processing tasks, and the like. In one embodiment, the machine-learned models deployed by the model serving system 150 are models configured to perform one or more NLP tasks. The NLP tasks include, but are not limited to, text generation, query processing, machine translation, chatbot applications, and the like. In one embodiment, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one embodiment, the inference task for the model serving system 150 can primarily be based on reasoning and summarization of knowledge specific to the online system 140, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

Thus, in one embodiment, the online system 140 is connected to an interface system 160. The interface system 160 receives an external corpus of data from the online system 140 and builds a structured index over the data using another machine-learned language model or heuristics. The interface system 160 receives one or more task requests from the online system 140 based on the external data. The interface system 160 constructs one or more prompts for input to the model serving system 150. A prompt may include the task request of the user and context obtained from the structured index of the external data. In one instance, the context in the prompt includes portions of the structured indices as contextual information for the query. The interface system 160 obtains one or more responses to the query from the model serving system 150 and synthesizes a response. While the online system 140 can generate a prompt using the external data as context, oftentimes, the amount of information in the external data exceeds prompt size limitations configured by the machine-learned language model. The interface system 160 can resolve prompt size limitations by generating a structured index of the data and offers data connectors to external data and provides a flexible connector to the external corpus.

In one embodiment, the online system 140 performs an inference task in conjunction with the model serving system 150 and/or the interface system 160 to continuously monitor conversations between users and shoppers to determine whether a message sent by a sending party can be automatically responded to rather than prompting the receiving party for a manual response. For example, an example message from a shopper may be "What is your door code to your complex?" The online system 140 constructs a prompt including the message, a task request to the LLM on whether an automated response can be generated for the message, and other contextual information including the current chat history or previous interactions between users and shoppers. As an example, the online system 140 receives a response from the LLM that recites "The door code is 1234." The online system 140 automatically provides a response to the message without the receiving party's (e.g., user's) manual involvement.

In one embodiment, the online system 140 can further be augmented to classify and reroute certain user or shopper requests that impact an order's end state by intercepting the conversation on behalf of either party and performing one or more automated actions based on the content of the message. The online system 140 continuously provides one or more messages from a conversation to the model serving system 150 and/or the interface system 160 and receives a response for each message that indicates whether the message is an inquiry, action-oriented, or under a time constraint.

If the message is determined to be an inquiry, the message by the sending party is provided to the receiving party such that the user is prompted to provide a manual reply. If a message (e.g., a message from a customer requesting that bananas be added in an order) is determined to be action-oriented, the message is one that can be automatically responded to by the online system 140 by performing an automated action based on various types of contextual information, including previous interactions between shoppers and users, the history of the current conversation, and the like. From the response, the online system 140 extracts a desired action to be performed for the message (e.g., add bananas to order).

In one embodiment, the responses from the LLM on whether a message is action-oriented and can be automatically responded to is determined based on previous chat history across different shoppers and users of the online system 140 to infer common interactions that previously resulted in certain actions being performed as a response. Specifically, in one embodiment, the online system 140 provides the model interface system 160 with a collected history of previous chats between shoppers and users that provide insight into which messages are action-oriented and what types of desired actions can be performed to respond to a message. The online system 140 provides the messages of a conversation to the interface system 160 such that the interface system 160 constructs the appropriate prompts to the model serving system 150 based on the database of previous chat histories. In other instances, the online system 140 provides the messages of a conversation directly to the model serving system 150 with a generated prompt that includes the message and contextual information about previous chat histories between users and shoppers.

In one embodiment, the online system 140 maintains a set of rule actions which are categories of actions that can automatically be invoked in response to a message. For example, the rule actions may include automatically adding user item requests to an order, summarizing delivery instructions from a user, responding to the message in the conversation, and the like. Responsive to determining a desired action from the response of the LLM, the online system 140 determines whether an appropriate rule action (e.g., add items to an existing order) that corresponds to the desired action exists. If the rule action exists, the online system 140 invokes the desired action for the order (e.g., update customer's order to add bananas) and automatically sends a notification message (e.g., "I have added bananas to your order") to the sending party from the receiving party.

In this manner, the online system 140 identifies messages for which automated actions or responses can be made, and automatically intercepts conversations on behalf of the receiving party. This allows the online system 140 to eliminate human interaction when responding to action-oriented messages, allowing for automated and efficient processing of customer orders.

Figure 1B:
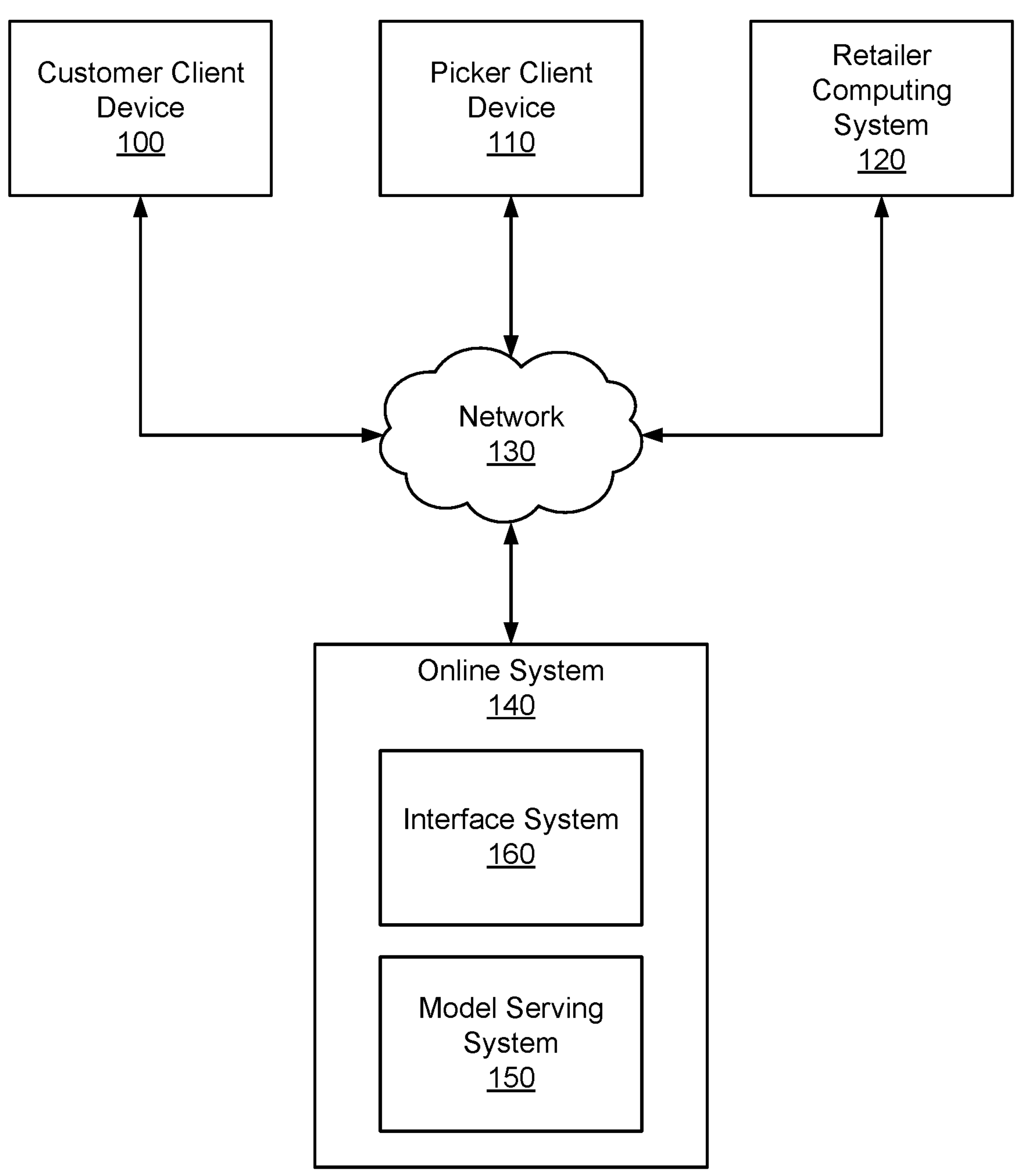
FIG. 1B illustrates an example system environment for an online system, in accordance with some embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 are each managed by an entity separate from the entity managing the online system 140. In one embodiment, as illustrated in the example system environment in FIG. 1B, the model serving system 150 or the interface system 160 is managed and deployed by the entity managing the online system 140.

Figure 2:
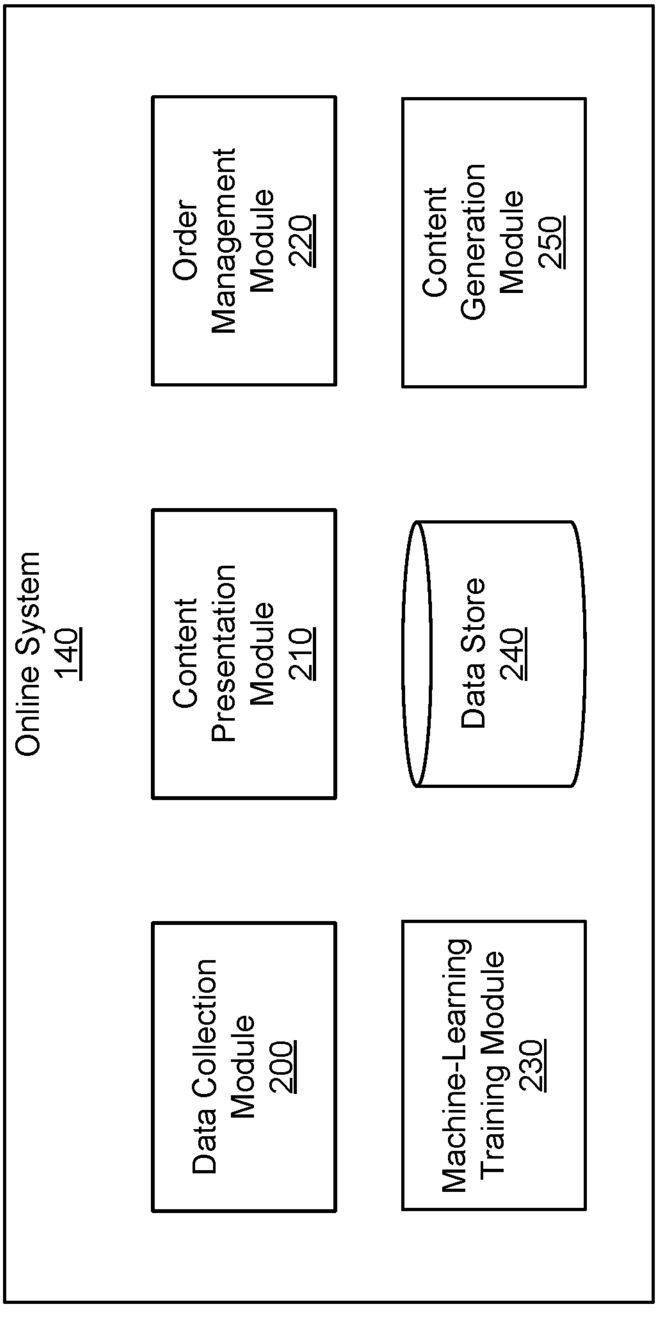
FIG. 2 illustrates an example system architecture for an online system, in accordance with some embodiments.

FIG. 2 illustrates an example system architecture for an online system 140, in accordance with some embodiments. The system architecture illustrated in FIG. 2 includes a data collection module 200, a content presentation module 210, an order management module 220, a machine learning training module 230, a data store 240, and a content generation module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

In one embodiment, the data collection module 200 also collects communication data, which is different types of communication between shoppers and users of the online system 140. For example, the data collection module 200 may obtain text-based, audio-call, video-call based communications between different shoppers and users of the online system 140 as orders are submitted and fulfilled. The data collection module 200 may store the communication information by individual user, individual shopper, per geographical region, per subset of users having similar attributes, and the like.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In one embodiment, the content presentation module 210 receives one or more recommendations for presentation to the customer while the customer is engaged with the ordering interface. The list of ordered items of a customer may be referred to as a basket. As described in conjunction with FIGS. 1A and 1B, the recommendations are generated based on the inferred purpose of the basket of the customer and include one or more suggestions to the customer to better fulfill the purpose of the basket.

In one instance, the recommendations are in the form of one or more equivalent baskets that are modifications to an existing basket that serve the same or similar purpose as the original basket. The equivalent basket is adjusted with respect to metrics such as cost, healthiness, whether the basket is sponsored, and the like. For example, an equivalent basket may be a healthier option compared to the existing basket, a less expensive option compared to the existing basket, and the like. The content presentation module 210 may present the equivalent basket to the customer via the ordering interface with an indicator that states how an equivalent basket improves or is different from the existing basket (e.g., more cost-effective, healthier, sponsored by a certain organization). The content presentation module 210 may allow the customer to swap the existing basket with an equivalent basket.

In one instance, when the basket includes a list of edible ingredients, the recommendations are in the form of a list of potential recipes the ingredients can fulfill, and a list of additional ingredients to fulfill each recipe. The content presentation module 210 may present each suggested recipe and the list of additional ingredients for fulfilling the recipe to the customer. The content presentation module 210 may allow the customer to automatically place one or more additional ingredients in the basket of the customer.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The content generation module 250 generates recommendations to present to users that contain content (e.g., images, video, or text) that is personalized for the users and their current online sessions. However, the large number of possible contexts and user preferences makes it difficult to scale the generation of this recommendation. Rather than manually creating the content, therefore, the content generation module 250 uses a generative model (e.g., a trained diffusion model) to generate the ad content. The content generation module 250 generates a text prompt for the generative model, such as by filling in a template with information about context/session details (e.g., items that the user has put into the cart) and user preferences details (e.g., information from the user's profile). The content generation module 250 then provides the text prompt to the generative model, which creates an image. The content generation module 250 may run post-processing or A/B testing to determine which auto-generated content is effective and appropriate to display to users and may store the auto-generated content in association with user-context clusters for later use. An example method for generating recommendations to present to users is described in further detail below.

Figure 3:
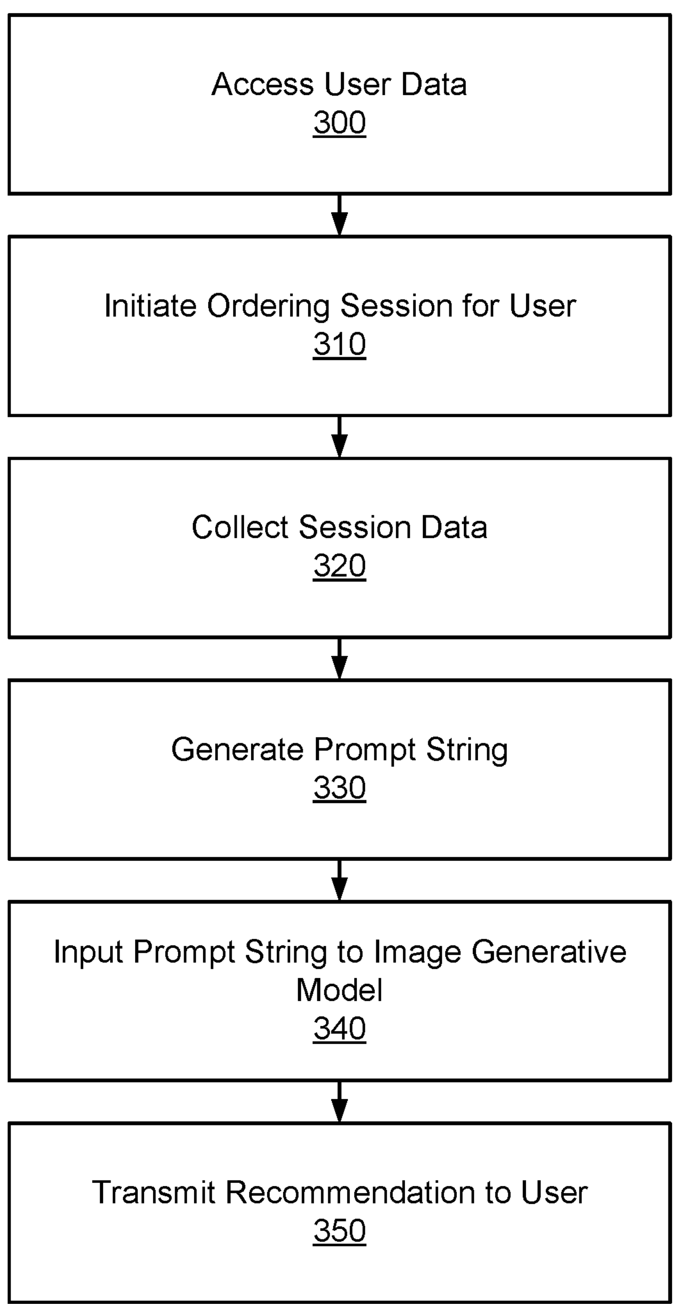
FIG. 3 is a flowchart for a method of generating recommendations to present to users, in accordance with some embodiments.

FIG. 3 is a flowchart for a method of generating recommendations to present to users, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system accesses 300 user data describing characteristics of users of the online system. The user data may include a user's name, address, shopping preferences, favorite items, or stored payment instruments. The user data also may include default settings established by the customer, such as a default retailer/retailer location, payment instrument, delivery location, or delivery timeframe.

The online system receives requests from users to initiate ordering sessions. An ordering session is an application session whereby the users can order items to be delivered to them by pickers of the online system. The online system initiates 310 an ordering session for a user by transmitting an ordering user interface to the user's client device. The user can use this ordering user interface to generate an order for the online system to fulfill.

As the user interacts with the online system through the ordering system, the online system collects 320 session data describing the user's session. For example, the online system may collect data describing the items that the user has added to their shopping list, which items the user has viewed, and search queries the user has submitted. Generally, the session data is limited to data describing a particular ordering system with the online system. Session data may be added to user data for the user when the ordering session ends for historical information on the user's interactions with the online system.

The online system generates 330 a prompt string based on the collected session data and the user data for the user. The online system may generate the prompt string by using a prompt template and filling out the prompt template with user data for the user and the collected session data. For example, the online system may use a prompt template such as "generate an image for a recommendation for [brand/item] for a user who is currently shopping for items: {[X],], [Y], [Z], . . . } and who has the attributes: {[A], [B], [C], . . . }." In some embodiments, the online system identifies a template prompt to use for generating prompt strings by performing A/B testing on template prompts, where each template prompt is scored based on the performance of recommendations generated based on each template prompt. The prompt string may also include fields for a type of recommendation for which the image will be used. For example the prompt string may indicate that the image will be used to recommend a particular item, brand, type of item, or event.

In some embodiments, the online system generates the prompt string using a prompt generation model. A prompt generation model is a machine-learning model that is trained to generate prompt strings for prompting an image generative model to generate recommendations. To generate a prompt string, the online system passes the user data for the user and the session data describing the user's session to the prompt generation model.

The online system trains the prompt generation model based on a set of training examples. Each training example may include user data describing a user, session data describing the user's session, and a label indicating the performance of recommendations with images generated by the image generative model. The online system uses a loss function that scores the prompt strings output by the prompt generation model based on the performance of recommendations using the images generated based on the prompt strings.

In some embodiments, the online system uses an intermediary machine-learning model to identify a context for the user's ordering session. For example, the context for the ordering session may be an item of interest to the user that the user is looking for, a recipe of interest for which the user is ordering items, or an event for which the user is ordering items. The online system may apply this intermediary context identification model to user data and session data for the user to generate a context identifier for the ordering session, where the context identifier identifies a context for the ordering session. In some embodiments, to identify a context for the ordering session, the context identification model generates a score for each of a set of context identifiers that represents a likelihood that the context corresponding to the context identifier is applicable to the ordering session. The context identification model selects one or more of the context identifiers for the ordering session based on the generated scores (e.g., by selecting a top n context identifiers or by selecting context identifiers based on scores that exceed a threshold).

The online system may store a mapping of context identifiers to textual descriptions of contexts and may map the contextual identifier onto a textual description to include in the prompt string. For example, for a contextual identifier that corresponds to a recipe for making a pizza, a corresponding textual description may be "Recipe: Pizza." The textual description may simply be a phrase that represents the context or may describe details of what the context for the ordering session likely is. In some embodiments, the online system generates multiple context identifiers for different types of contexts relevant to an ordering session and includes textual descriptions for each of these contexts in the prompt string.

The online system inputs 340 the prompt string to an image generative model to generate an image for the recommendation. The image generative model is a generative machine-learning model that is trained to generate images based on a prompt string. The image generative model may be part of a model serving system (e.g., model serving system 150). The image generative model may use a language model to generate a latent representation of the text prompt and then an image generation model that generates an image based on the latent representation.

In some embodiments, to reduce latency in serving recommendations due to image generation, the online system may pre-generate sets of images for recommendations using the method described above. For instance, each set of images may be associated with a user-context pair, where the user-context pair represents a cluster of similar users and a context for the user's session. For example, the online system may have clusters of users based on age ranges (e.g., 18-25, 26-40, 41-60, 60+) and may have a set of potential ordering contexts (e.g., shopping for party, shopping for gift, regular groceries). The online system may pair each cluster of users with each context, pre-generate a set of images as described above, and store the pre-generated set of images in association with each user-context pair. That way, to select an image to include in a recommendation to present to a user during a session, the online system can simply identify a cluster to which the user belongs, determine a context for the user's session, and select one of the pre-generated images to present to the user.

Therefore, to use pre-generated sets of images for recommendations, the online system may identify a cluster to which the user belongs based on the user data. For example, each cluster may include user data criteria that specify what user data characteristics a user must have to be included in the cluster. This user data criteria may include values for user data characteristics that a user must have (e.g., a zip code or a phone number area code) or may set ranges for values of user data (e.g., a range of age values). The user data criteria may be set for each cluster such that a user belongs to only one of the clusters. The online system also identifies a context for the user's ordering session (e.g., using a context identifier) and identifies an image to include in a recommendation. As noted above, the online system may store pre-generated images in a mapping of user-context pairs to pre-generated images, and the online system may use this mapping to identify a pre-generated image to include in a recommendation for a user.

Figure 4:
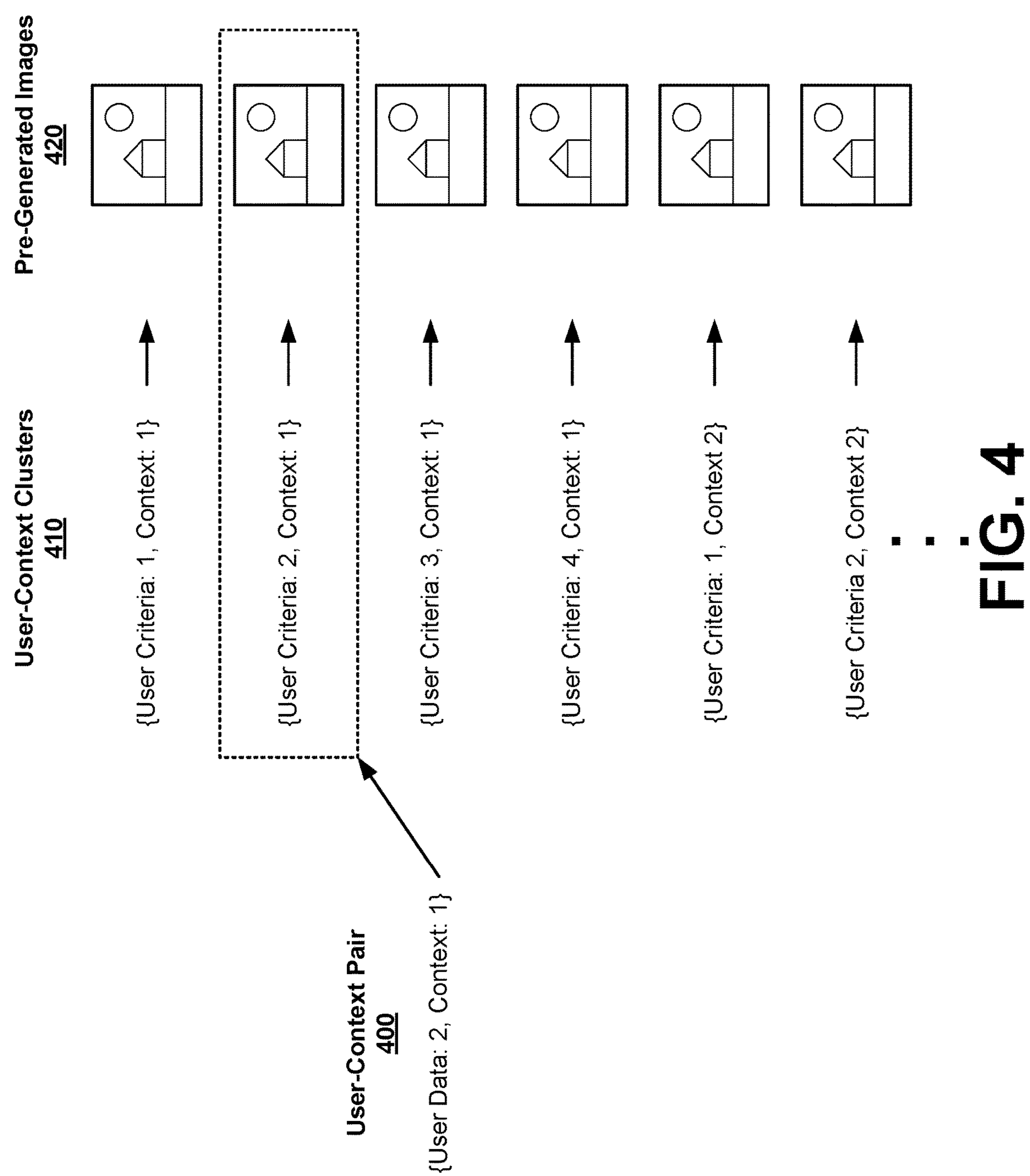
FIG. 4 illustrates an example selection of a pre-generated image based on a user-context pair for a user, in accordance with some embodiments.

FIG. 4 illustrates an example selection of a pre-generated image 420 based on a user-context pair 400 for a user, in accordance with some embodiments. The online system maps the user-context pair 400 to a user-context cluster 410 by identifying a cluster that has criteria that matches the user-context pair 400. The online system identifies a pre-generated image 420 associated with that user-context cluster 410 and uses that pre-generated image 420 for a recommendation to present to a user.

The online system generates a recommendation that includes the generated image and transmits 350 the recommendation to the user during the user's session. The recommendation may be presented to the user as part of an ordering user interface presented to the user. The user may interact with the recommendation to view information relating to the recommendation (e.g., to view information on an item depicted in the generated image included in the recommendation).

Figure 5:
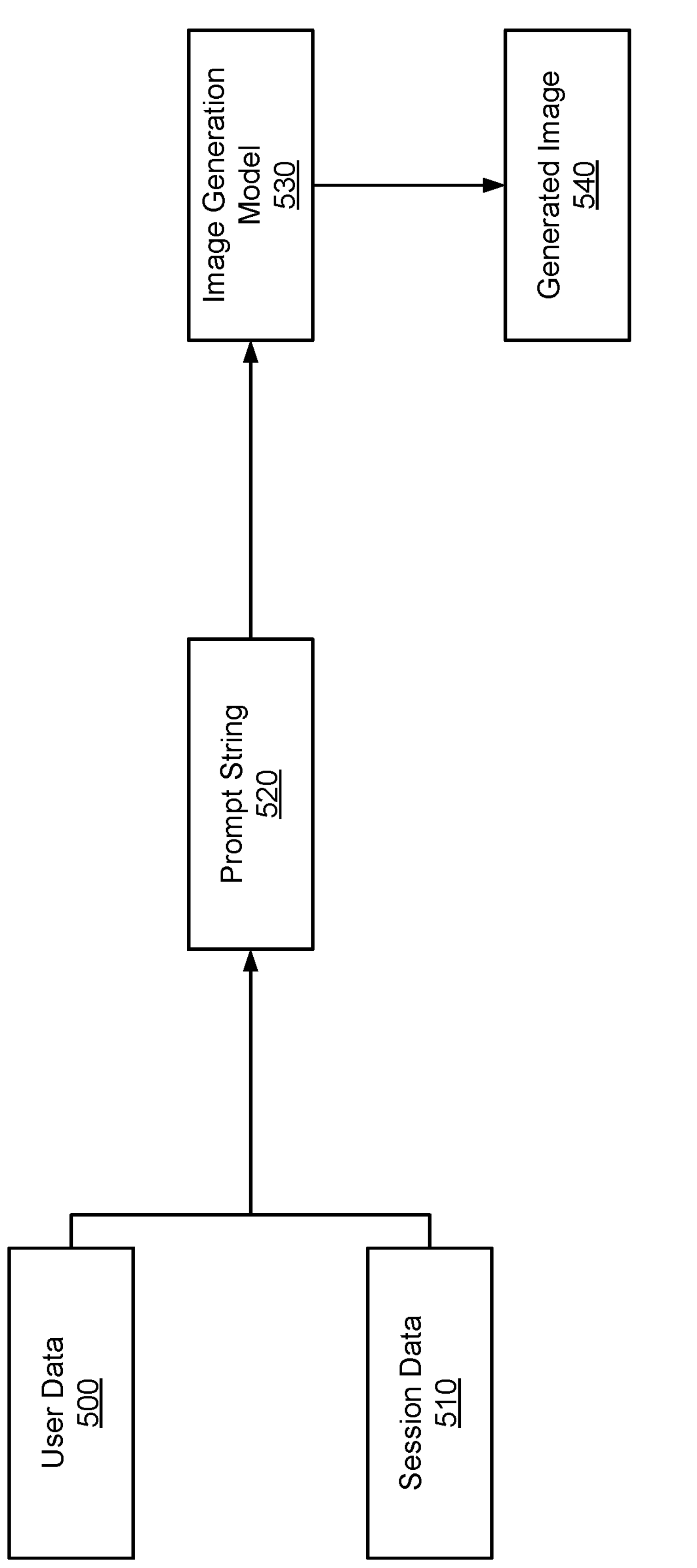
FIG. 5 illustrates an example data flow to generate an image for a recommendation based on user data from a user and session data describing the user's session, in accordance with some embodiments.

FIG. 5 illustrates an example data flow to generate an image for a recommendation based on user data from a user and session data describing the user's session, in accordance with some embodiments. As noted above, the online system accesses user data 500 associated with the user and collects session data 510 as the user interacts with the online system through the ordering session. The online system generates a prompt string 520 based on the user data 500 and the session data 510 and inputs that prompt string 520 to an image generation model 530 to generate an image 540 for a recommendation.

While the recommendation generation method described above primarily describes generating images for recommendations, the online system may use a similar method to generate other types of content, such as text or video.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

accessing user data for a user of an online system, wherein the user data describes characteristics of the user;

receiving a request to initiate an ordering application session from a client device associated with the user;

initiating an ordering application session for the user based on the received request;

collecting session data associated with the ordering application session, wherein the session data describes characteristics of interactions by the user with the online system through the ordering application session;

generating a prompt string based on the user data and the collected session data, wherein the prompt string is a string describing a prompt for an image for a recommendation to be presented to the user;

generating an image for the recommendation by inputting the prompt string to an image generative model, wherein the image generative model is a generative machine-learning model that is trained to generate images based on prompts;

generating a recommendation for the user comprising the generated image; and transmitting the generated recommendation to the client device, wherein transmitting the generated recommendation to the client device causes the client device to display the recommendation to the user.

2. The method of claim 1, wherein initiating an ordering application session for the user comprises:

transmitting an ordering user interface to the client device for display to the user.

3. The method of claim 2, wherein collecting session data comprises:

collecting data describing characteristics of interactions of the user with the online system through the ordering user interface.

4. The method of claim 1, wherein generating the prompt string comprises:

generating the prompt string based on a prompt template that comprises fields for the accessed user data and the collected session data.

5. The method of claim 1, wherein generating the prompt string comprises:

applying a prompt generation model to the user data and the session data, wherein the prompt generation model is a machine-learning model that is trained to generate a text string to prompt an image generation model to generate an image based on user data and session data.

6. The method of claim 1, wherein generating the prompt string comprises:

identifying a context for the application session based on the collected session data; and generating the prompt string based on the identified context.

7. The method of claim 6, wherein identifying the context comprises:

generating a score for a context identifier associated with the context by applying a context identification model to the collected session data, wherein the context identification model is a machine-learning model that is trained to generate scores representing likelihoods that a context corresponds to an ordering application session associated with input session data.

8. The method of claim 6, further comprising:

storing the generated image in association with a user-context cluster, wherein the user-context cluster corresponds to the user data of the user and the identified context.

9. The method of claim 6, wherein the identified context represents an item of interest to the user, a recipe of interest to the user, or an event for which the user is ordering items.

10. The method of claim 1, wherein the prompt string comprises natural-language instructions for the image generative model to generate the image for the recommendation based on the user data and the collected session data.

11. A non-transitory computer-readable medium storing instructions that, when executed by a processor, cause the processor to perform operations comprising:

accessing user data for a user of an online system, wherein the user data describes characteristics of the user;

receiving a request to initiate an ordering application session from a client device associated with the user;

initiating an ordering application session for the user based on the received request;

collecting session data associated with the ordering application session, wherein the session data describes characteristics of interactions by the user with the online system through the ordering application session;

generating a prompt string based on the user data and the collected session data, wherein the prompt string is a string describing a prompt for an image for a recommendation to be presented to the user;

generating an image for the recommendation by inputting the prompt string to an image generative model, wherein the image generative model is a generative machine-learning model that is trained to generate images based on prompts;

generating a recommendation for the user comprising the generated image; and transmitting the generated recommendation to the client device, wherein transmitting the generated recommendation to the client device causes the client device to display the recommendation to the user.

12. The computer-readable medium of claim 11, wherein initiating an ordering application session for the user comprises:

transmitting an ordering user interface to the client device for display to the user.

13. The computer-readable medium of claim 12, wherein collecting session data comprises:

collecting data describing characteristics of interactions of the user with the online system through the ordering user interface.

14. The computer-readable medium of claim 11, wherein generating the prompt string comprises:

generating the prompt string based on a prompt template that comprises fields for the accessed user data and the collected session data.

15. The computer-readable medium of claim 11, wherein generating the prompt string comprises:

applying a prompt generation model to the user data and the session data, wherein the prompt generation model is a machine-learning model that is trained to generate a text string to prompt an image generation model to generate an image based on user data and session data.

16. The computer-readable medium of claim 11, wherein generating the prompt string comprises:

identifying a context for the application session based on the collected session data; and generating the prompt string based on the identified context.

17. The computer-readable medium of claim 16, wherein identifying the context comprises:

generating a score for a context identifier associated with the context by applying a context identification model to the collected session data, wherein the context identification model is a machine-learning model that is trained to generate scores representing likelihoods that a context corresponds to an ordering application session associated with input session data.

18. The computer-readable medium of claim 16, further comprising:

storing the generated image in association with a user-context cluster, wherein the user-context cluster corresponds to the user data of the user and the identified context.

19. The computer-readable medium of claim 16, wherein the identified context represents an item of interest to the user, a recipe of interest to the user, or an event for which the user is ordering items.

20. A system comprising: a processor and a non-transitory computer-readable medium storing instructions that, when executed by the processor, cause the processor to perform operations comprising:

accessing user data for a user of an online system, wherein the user data describes characteristics of the user;

receiving a request to initiate an ordering application session from a client device associated with the user;

initiating an ordering application session for the user based on the received request;

collecting session data associated with the ordering application session, wherein the session data describes characteristics of interactions by the user with the online system through the ordering application session;

generating a prompt string based on the user data and the collected session data, wherein the prompt string is a string describing a prompt for an image for a recommendation to be presented to the user;

generating an image for the recommendation by inputting the prompt string to an image generative model, wherein the image generative model is a generative machine-learning model that is trained to generate images based on prompts;

generating a recommendation for the user comprising the generated image; and transmitting the generated recommendation to the client device, wherein transmitting the generated recommendation to the client device causes the client device to display the recommendation to the user.

* * * * *